(12) United States Patent
Liu

(10) Patent No.: US 9,093,894 B2
(45) Date of Patent: Jul. 28, 2015

(54) MULTIPLE-LEVEL POWER CONTROL SYSTEM

(71) Applicant: GREENMARK TECHNOLOGY INC., New Taipei (TW)

(72) Inventor: Kwang-Hwa Liu, New Taipei (TW)

(73) Assignee: GREENMARK TECHNOLOGY INC., New Taipei (TW)

( * ) Notice: Subject to any disclaimer, the term of this patent is extended or adjusted under 35 U.S.C. 154(b) by 296 days.

(21) Appl. No.: 13/716,213

(22) Filed: Dec. 17, 2012

(65) Prior Publication Data

US 2014/0167728 A1    Jun. 19, 2014

(51) Int. Cl.
| | |
|---|---|
| H02M 7/06 | (2006.01) |
| G05F 1/455 | (2006.01) |
| H05B 33/08 | (2006.01) |
| H02P 4/00 | (2006.01) |

(52) U.S. Cl.
CPC ............. *H02M 7/066* (2013.01); *G05F 1/455* (2013.01); *H02P 4/00* (2013.01); *H05B 33/0809* (2013.01); *H05B 33/0854* (2013.01)

(58) Field of Classification Search
CPC ........... H02M 7/06; H02M 7/066; G05F 1/45; G05F 1/455
USPC ......... 323/237, 241, 244–246, 320, 322, 325, 323/905; 340/12.32, 12.33; 363/100, 124, 363/126, 127
See application file for complete search history.

(56) References Cited

U.S. PATENT DOCUMENTS

| | | | |
|---|---|---|---|
| 4,649,323 | A | 3/1987 | Pearlman et al. |
| 4,695,739 | A | 9/1987 | Pierce |
| 4,924,109 | A | 5/1990 | Weber |
| 5,015,994 | A | 5/1991 | Hoberman et al. |
| 5,081,411 | A | 1/1992 | Walker |
| 6,091,205 | A | 7/2000 | Newman, Jr. et al. |
| 6,174,073 | B1 | 1/2001 | Regan et al. |
| 6,369,517 | B2 | 4/2002 | Song et al. |
| 6,593,709 | B2 | 7/2003 | Lee et al. |
| 6,727,665 | B2 | 4/2004 | Yao |
| 6,877,885 | B2 | 4/2005 | Eusterbrock |
| 7,019,469 | B1 | 3/2006 | Thurk et al. |
| 7,355,523 | B2 | 4/2008 | Sid |
| D574,333 | S | 8/2008 | Hewson et al. |
| 7,446,671 | B2 | 11/2008 | Giannopoulos et al. |
| 7,476,988 | B2 | 1/2009 | Mulhouse et al. |
| 7,489,088 | B2 | 2/2009 | Frid |
| 7,511,628 | B2 | 3/2009 | Salvestrini |
| 7,609,007 | B1 | 10/2009 | Kumar |
| 7,663,325 | B2 | 2/2010 | McDonough et al. |
| 7,701,150 | B2 | 4/2010 | Nguyen et al. |
| 7,804,255 | B2 * | 9/2010 | Ostrovsky et al. ............ 315/291 |
| 7,834,856 | B2 | 11/2010 | Grinshpoon et al. |
| RE42,425 | E | 6/2011 | DeJonge et al. |
| 7,956,694 | B1 | 6/2011 | Wilson |
| 7,969,100 | B2 | 6/2011 | Xu et al. |
| 8,089,216 | B2 | 1/2012 | Negrete |

(Continued)

*Primary Examiner* — Fred E Finch, III

(74) *Attorney, Agent, or Firm* — Jianq Chyun IP Office

(57) ABSTRACT

A multiple-level power control system is provided, which includes a power state controller, an electric power device, and a multi-level power driver. The power state controller outputs a phase-notch pattern. The multi-level power driver drives the electric power device at one of a plurality of power levels, decodes the phase-notch pattern as a power step command, and switches from one of the power levels to another one of the power levels according to the power step command.

17 Claims, 12 Drawing Sheets

(56) References Cited

U.S. PATENT DOCUMENTS

| | | | |
|---|---|---|---|
| 8,350,678 B1* | 1/2013 | Xiong et al. | 340/12.33 |
| 2006/0077046 A1* | 4/2006 | Endo | 340/310.11 |
| 2008/0157939 A1* | 7/2008 | Sutardja | 340/310.12 |
| 2009/0160627 A1* | 6/2009 | Godbole | 340/310.11 |
| 2009/0243582 A1* | 10/2009 | Irissou et al. | 323/320 |
| 2009/0284182 A1* | 11/2009 | Cencur | 315/307 |
| 2010/0123449 A1* | 5/2010 | Yang et al. | 323/325 |
| 2011/0032085 A1* | 2/2011 | Maros et al. | 340/310.11 |
| 2011/0115399 A1* | 5/2011 | Sadwick et al. | 315/287 |

* cited by examiner

US 9,093,894 B2

MULTIPLE-LEVEL POWER CONTROL SYSTEM

BACKGROUND OF THE INVENTION

1. Field of the Invention

The present invention relates to a power control system. More particularly, the present invention relates to a multiple-level power control system.

2. Description of the Related Art

In general, a typical ceiling light or a ceiling fan uses a wall-mounted power switch to provide a basic ON-OFF control. However, most wall-mounted switches in use today are of the single-pole, single-throw type. Therefore, in most existing home lighting systems, a typical wall-mounted switch breaks the current-flow loop at only one of the two alternating current (AC) lines, not both. As shown in FIG. 1, two AC lines 101 (AC1) and 102 (AC2) are intended for providing the utility AC voltage 100 to a ceiling lamp 105. But only AC line 102 is actually wired to the input side of a wall switch 104. The output side of wall switch is connected back to lamp 105 via a return wire 103.

A conventional power switch, such as the wall switch 104, can offer only ON-OFF function. At its ON position, the power switch provides un-impeded current flow; whereas at its OFF position, the power switch disconnects (or isolates) the load (such as lamp 105) from one or both AC lines that provide the utility AC voltage.

SUMMARY OF THE INVENTION

Accordingly, the present invention is directed to a multiple-level power control system. The system provides multiple intermediate power levels with a simple architecture.

According to an embodiment of the present invention, a multiple-level power control system is provided. The multiple-level power control system includes a power state controller, an electric power device such as an light-emitting diode (LED) lamp, a multi-level power driver, a first AC line, a second AC line, and an intermediate AC line.

The power state controller outputs a phase-notch pattern. The multi-level power driver drives the electric power device at one of a plurality of power levels, decodes the phase-notch pattern as a power step command, and switches from one of the power levels to another one of the power levels according to the power step command. The first AC line is coupled between a utility AC voltage and the multi-level power driver. The second AC line is coupled between the utility AC voltage and the power state controller. The intermediate AC line is coupled between the power state controller and the multi-level power driver. Both of the power state controller and the multi-level power driver are powered by the utility AC voltage through the first AC line, the second AC line, and the intermediate AC line. The power state controller outputs the first phase-notch pattern on the intermediate AC line to the multi-level power driver.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
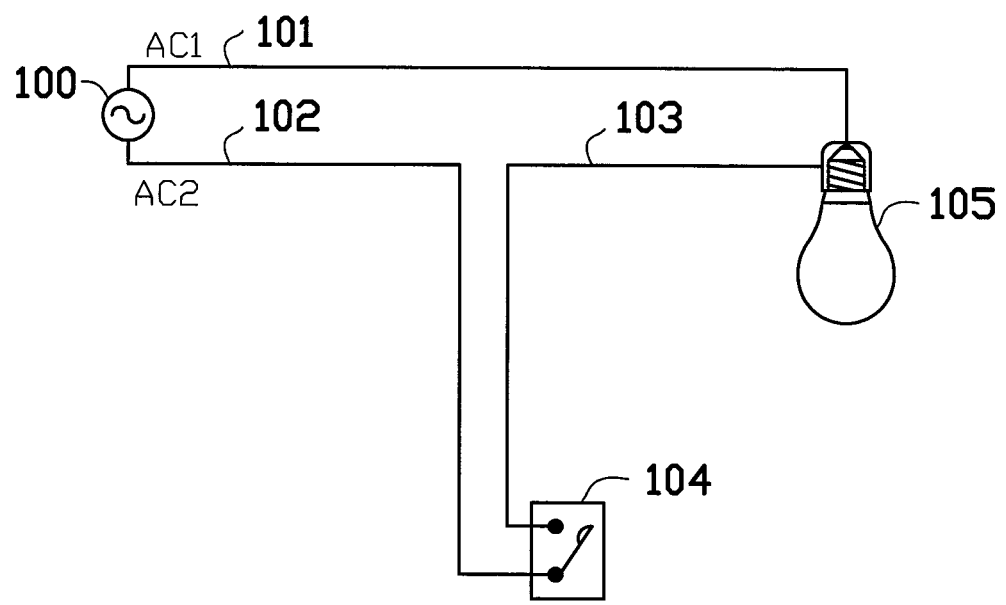
FIG. 1 is a schematic diagram showing a conventional power control system.

Reference will now be made in detail to the present embodiments of the invention, examples of which are illustrated in the accompanying drawings. Wherever possible, the same reference numbers are used in the drawings and the description to refer to the same or like parts.

It is desirable to offer one or more intermediate power levels for a lighting system. For example, a low-level of 20% power and a medium-level of 50% power, in addition to the fully-ON state and the fully-OFF state. It is also desirable to provide such intermediate power level control without adding any extra control wire or wires to the original two AC power lines.

It is desirable not to use continuous phase-cut control methods such as triac dimmers. Triac dimmers tend to generate severe electro-magnetic inference (EMI), acoustic noise, and serious current waveform harmonic distortion.

It is desirable not to use radio frequency (RF) or infra-red (IR) remote control methods. RF and IR remote control methods tend to be expensive and complicated. Further, an IR receiver cannot operate at an ambient temperature of higher than 80° C. Unfortunately, it is very common that an integral light-emitting diode (LED) lamp runs at temperature higher than 80° C. On the other hand, an RF remote control receiver often suffers from electromagnetic interference noise produced by various home appliances such as microwave ovens and garage door openers.

It is also desirable to provide an intelligent or automatic lighting control or air-condition control without any human intervention.

In order to implement a multiple-level power control system, we need to install a power state controller (e.g. a wall-mounted touch pad) to replace the wall switch, and add a power-step signal decoder to the power driver of the controlled device (e.g. an LED lamp).

The multiple-level power control system includes a step-up command for switching the multiple power levels, or power states, with state N rounding back to state 1. For example, a first instance of step-up command signal triggers the state change from State-1 to State-2. A second instance of step-up command signal triggers the state change from State-2 to State-3 A third instance of step-up command signal triggers the state change from State-3 to State-4. A fourth instance of step-up command signal triggers the state change from State-4 back to State-1 again.

The multiple-level power control system may further include a step-down command, with state 1 rounding to state N. For example, a first instance of step-down command signal triggers the state change from State-4 to State-3. A second instance of step-down command signal triggers the state change from State-3 to State-2. A third instance of step-down command signal triggers the state change from State-2 to State-1. A fourth instance of step-down command signal triggers the state change from State-1 to State-4 again.

The multiple-level power control system may further include a power-on command and a power-off command. The power-on, power-off, and power-step commands may be triggered by one or more actuators. There are mainly two kinds of actuators set forth in the present invention, namely, manual actuators and automatic actuators. A manual actuator may be a toggle switch, a push button, a turning knob, a touch pad, or a touch sensor. An automatic actuator may be a photo-sensor, a sound sensor, a temperature sensor, a pressure sensor, a humidity sensor, an image sensor, a video image camera, an RF sensor, or a passive infra-red (PIR) sensor.

The step-up command and the step-down command are collectively referred to as power-step commands. Each power-step command may be represented by a pre-determined phase-notch pattern. A phase-notch pattern is defined as, by momentarily breaking the current-flow path from phase angle α1 to phase angle α2 in a single AC line cycle, a portion of the sinusoidal AC voltage is blocked to zero value. Please notice that phase angles α1 and α2 are pre-determined values, typically less than 360°.

In an embodiment of the present invention, a power state controller replaces the conventional wall switch. The power state controller includes a phase-notch generator and a power state control logic circuit. There is a multi-level power driver added to the controlled device, such as a ceiling lamp or a ceiling fan. The multi-level power driver includes a power converter, a phase-notch decoder, and a power level register.

A power state register (whose value can be from 0 to N) in the power state control logic circuit of the power state controller and the power level register (whose value can be from 1 to N) in the controlled device are synchronized to the same value. Each value represents a different power state. Please notice that the power level register has never a value of 0; and N is a pre-determined positive integer greater than 1.

Power-Step Command

The power state controller generates a phase-notch pattern out of the original sinusoidal line voltage waveform, by briefly breaking the current-flow path and thereby causing some portion of the sinusoidal voltage waveform to be blocked to zero. Each issue of phase-notch pattern corresponds to a power-step command. In general, for a multiple-level power control system, it uses only a single actuator and only one type of power-step command, and therefore requires only one type of phase-notch pattern. For example, a touch sensor may trigger a step-down command.

However, in some systems, it is desirable to have more than one types of power-step command. For example, in a ceiling fan control system, a step-up command is used to direct the fan to spin faster by one level, whereas a step-down command is used to direct the fan to spin slower by one level. In a system featuring two types of power-step commands, two different phase-notch patterns are generally required. Each phase-notch pattern corresponds to a different power-step command.

Please notice also, two different power-step commands normally require two separate actuators. For example, in the afore-mentioned ceiling fan control system, a first push button may be used for the step-up command; and a second push button may be used for the step-down command.

Definition of Phase-Notch Patterns

The utility AC voltage has a sinusoidal waveform with a line frequency of either 50 Hz or 60 Hz. Each full AC line cycle, from 0° to 360°, has two zero-crossing points, one at the phase angle of 0°, and the other at the phase angle of 180°.

Figure 2A:
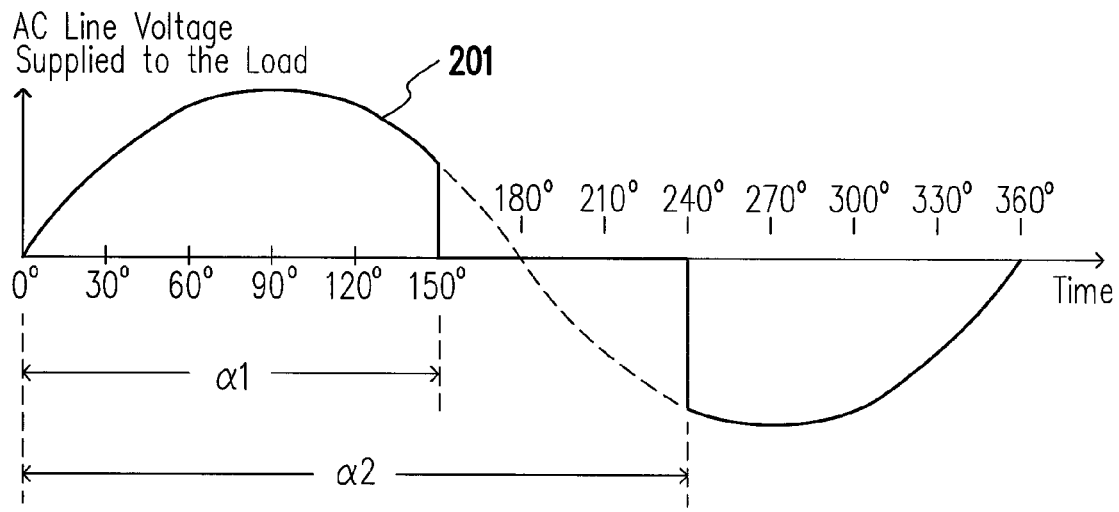
FIG. 2A, FIG. 2B, FIG. 3A and FIG. 3B are waveform diagrams showing some phase-notch patterns according to an embodiment of the present invention.

An embodiment of the present invention creates a phase-notch pattern on the original sinusoidal line voltage waveform to issue a power-step command. A phase-notch pattern is a signal with a voltage level of zero volts and with a width of a pre-determined number of phase angles of an AC line cycle. For example, the line voltage waveform 201 is blocked to zero-volt from phase angle α1 to phase angle α2, as shown in FIG. 2A.

Normally, α1 and α2 are set to 360° or shorter. In FIG. 2A, line voltage waveform 201 has a phase-notch pattern of [α1, α2], where α1=150°, and α2=240°. The width of a phase-notch pattern [α1, α2] is α2 minus α1. Therefore, the width of the phase-notch pattern in line voltage waveform 201 is 240°−150°=90°.

Figure 2B:
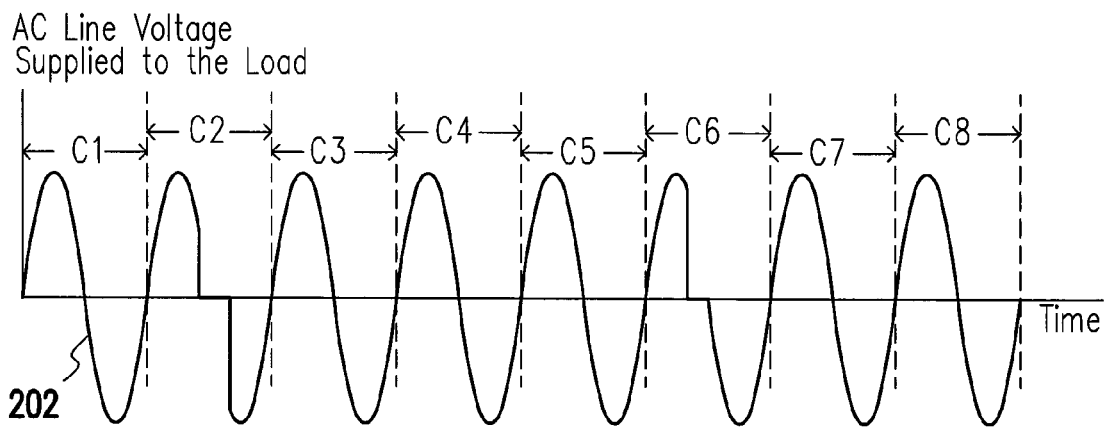

FIG. 2B illustrates eight line cycles C1-C8 of AC line voltage waveform 202 supplied to the load (the controlled device). In FIG. 2B, line voltage waveform 202 has a phase-notch pattern of [150°, 240°] in line cycle C2. In addition, waveform 202 has a phase-notch pattern of [120°, 180°] in line cycle C6.

Figure 3A:
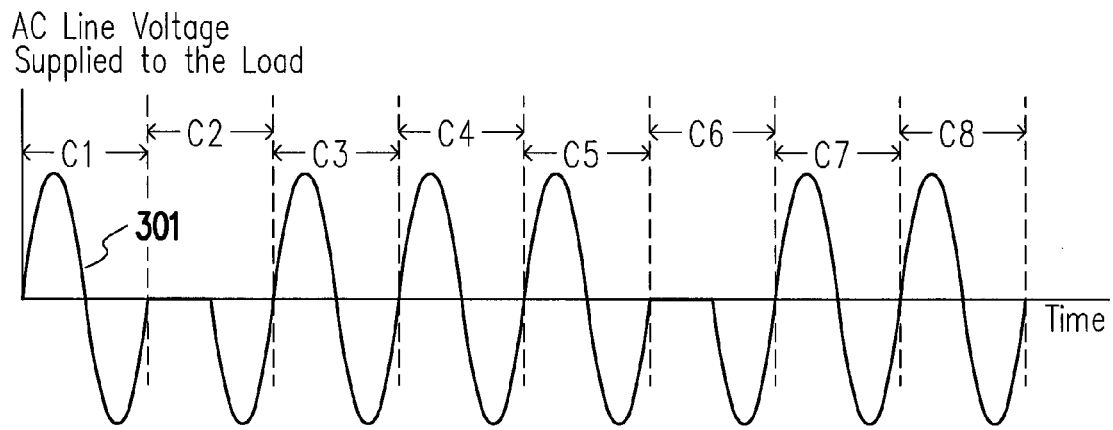

In FIG. 3A, line voltage waveform 301 has a phase-notch pattern of [0°, 180°] in line cycle C2, and another [0°, 180°] phase-notch pattern in line cycle C6.

Figure 3B:
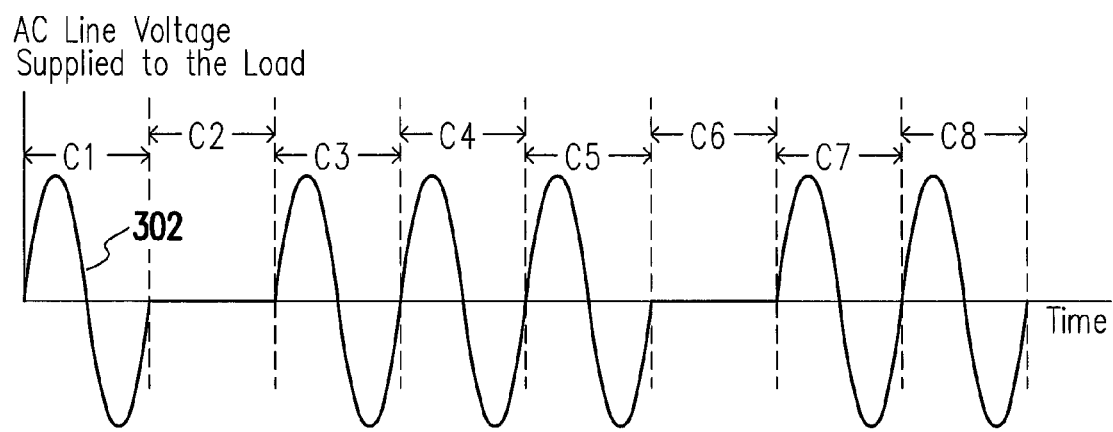

In FIG. 3B, line voltage waveform 302 has a phase-notch pattern of [0°, 360°] in line cycle C2 and another [0°, 360°] phase-notch pattern in line cycle C6.

The First Preferred Embodiment

Figure 4:
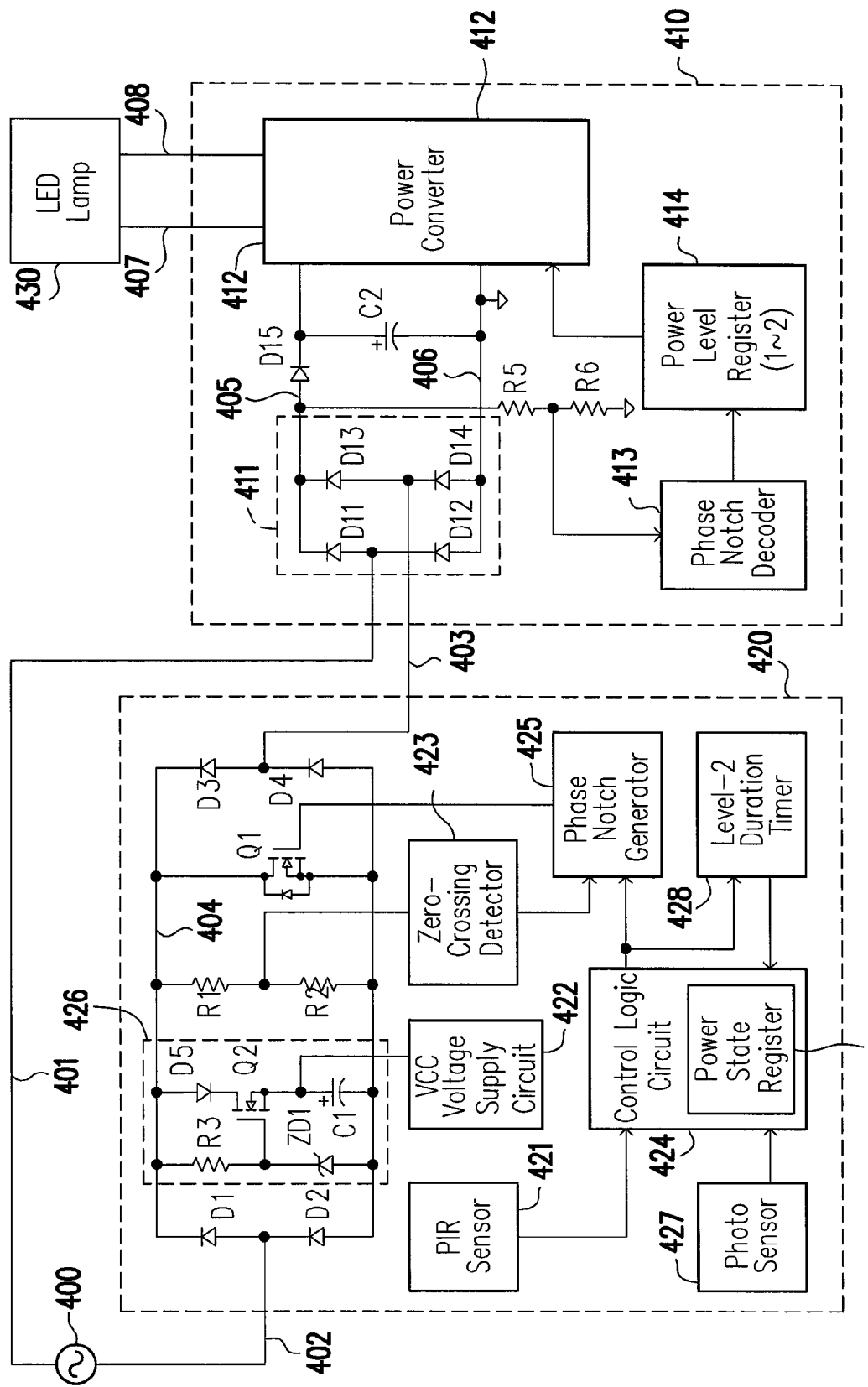
FIG. 4 is a schematic diagram showing a multi-level power control system according to an embodiment of the present invention.

A bi-level passive infra-red lighting control system according to an embodiment of the present invention is shown in FIG. 4. The system includes an LED lamp 430, a bi-level LED lighting driver 410, a PIR-triggered power state controller 420, two utility AC lines 401 (AC1) and 402 (AC2), an intermediate AC line, 403, and two direct current (DC) lines 407 and 408.

The left ends of AC lines 401 and 402 are coupled to an AC line voltage 400, such as the utility AC voltage. The system receives its operating power from the two AC lines, 401 (AC1) and 402 (AC2). Both of the said power state controller 420 and the said LED lighting driver 410 are powered by the said AC line voltage 400 through AC lines 401, 402 and intermediate AC line 403. Physically, the bulk of AC lines are laid out above the ceiling, whereas a section of line 402 is brought to the wall-mounted controller 420, and then returned to ceiling lamp 430 as the intermediate AC line 403.

The said LED lighting driver 410 further includes two AC input ends and two DC output ends. The first AC input end of driver 410 is coupled to AC line 401; the second AC input end of driver 410 is coupled to intermediate AC line 403. The two DC output ends of driver 410 are coupled to LED lamp 430 via DC lines 407 and 408.

Further, LED lighting driver 410 includes a bridge rectifier 411, a blocking diode D15, and a bulk capacitor C2, a DC-DC power converter 412, a phase-notch decoder 413, a power level register 414, and a voltage divider resistor pair, R5 and R6, coupled to the rectified AC voltage on line 405. The power level register 414 is coupled to phase-notch decoder 413. Power converter 412 is coupled to power level register 414. Bridge rectifier 411 is coupled to AC lines 401 and 403 and phase-notch decoder 413. The anode end of blocking diode D15 is coupled to bridge rectifier 411. Bulk capacitor C2 is coupled to the cathode end of blocking diode D15.

The said bridge rectifier 411 receives an AC voltage from AC line 401 and AC line 403, and produces a rectified AC voltage on line 405. The rectified AC voltage on line 405 charges capacitor C2 to a bulk DC voltage via blocking diode D15. The said DC-DC power converter 412 converts the bulk DC voltage on capacitor C2 to a constant DC current, and supplies the constant DC current to LED lamp 430. Please notice that the magnitude of the said constant DC current is regulated according to the integer value recorded in power level register 414. In other words, power converter 412 drives LED lamp 430 at the power level corresponding to the value recorded in the power level register 414.

In some embodiments of the present invention, power converter 412 may provide galvanic isolation between LED lighting driver 410 and LED lamp 430. In those embodiments, power converter 412 may be a flyback converter, a forward converter, or a half-bridge converter.

In some other embodiments of the present invention, power converter 412 does not provide galvanic isolation between LED lighting driver 410 and LED lamp 430. In those embodiments, power converter 412 may be a DC-DC converter or a linear regulator.

The said power state controller 420 includes a current-flow control circuit. The current-flow control circuit comprises a metal-oxide-semiconductor field-effect transistor (MOSFET) power switch Q1, and four diodes D1, D2, D3, D4, connected in a bridge rectifier manner. The drain end of power switch Q1 is connected to the cathode ends of diodes D1 and D3. Whereas the source end of Q1 is connected to the anode ends of diodes D2 and D4. The current-flow control circuit has an AC input end and an AC output end. The AC input end is coupled to the said second AC line 402; the AC output end is coupled to the said intermediate AC line 403. The anode end of diode D1 and the cathode end of diode D2 are coupled to the AC input end. The anode end of diode D3 and the cathode end of diode D4 are coupled to the AC output end.

The current-flow control circuit connects AC line 402 and intermediate AC line 403 to form a current-flow path to LED lighting driver 410 when phase-notch generator 425 turns on power switch Q1. The current-flow control circuit disconnects AC line 402 from intermediate AC line 403 to break the current-flow path when phase-notch generator 425 turns off power switch Q1.

The said power state controller 420 further includes a voltage-divider resistor pair R1 and R2, a zero-crossing detector 423, a VCC voltage supply circuit 422, and a high-voltage linear regulator 426. High-voltage linear regulator 426 is coupled between the drain end and the source end of power switch Q1. High-voltage linear regulator 426 includes a pull-up resistor R3, a zener diode ZD1, a MOSFET Q2, a blocking diode D5, and a capacitor C1. The selected resistance for R1 is 1MΩ, R2 is 16 kΩ, R3 is also 1MΩ. The zener diode ZD1 is selected to be about 12V. The voltage-divider pair R1 and R2 provides a scaled-down version of the AC line voltage to zero-crossing detector 423 when Q1 is turned off. When Q1 is off and the current-flow path is broken, high-voltage linear regulator 426 charges capacitor C1 by stealing some power from AC lines 402 and 403. The charged capacitor C1 produces a bulk voltage. VCC voltage supply circuit 422 is coupled to high-voltage linear regulator 426. VCC voltage supply circuit 422 receives the bulk voltage from capacitor C1 to produce an operating voltage VCC for power state controller 420. Zero-crossing detector 423 is coupled to the voltage divider R1 and R2 to detect the zero-crossing points of the AC line voltage waveform.

Please notice that power switch Q1 plays the role of a conventional wall switch in terms of making or breaking the AC current-flow path to LED lighting driver 410. With Q1 turned on, during the positive half line cycle, when AC line 401 has a higher voltage with respect to AC line 402, a current flows from AC line 401, through diode D11, diode D15, capacitor C2, diode D14, AC line 403, diode D3, power switch Q1, diode D2, and back to AC line 402. This current is mainly used to charge capacitor C2.

During the negative half line cycle, when AC line 402 has a higher voltage with respect to AC line 401, a current flows from AC line 402, through diode D1, power switch Q1, diode D4, AC line 403, diode D13, diode D15, capacitor C2, diode D12, and back to AC line 401. This current is also used to charge capacitor C2.

Therefore, when Q1 is turned on, Q1 connects AC line 402 with AC line 403 into direct contact. This is in effect similar to a conventional wall switch in an ON position.

On the other hand, when Q1 is turned off, the afore-mentioned current path now includes R1 with a resistance of 1MΩ in the loop. The charging current into capacitor C2 will be much reduced due to the extra resistance. With energy stored in capacitor C2 depleted, LED lighting driver 410 will soon shut down the power converter 412.

Please notice that, when power switch Q1 is turned on, there is essentially no voltage across the drain-source junction of Q1. In other word, there is no voltage on line 404 to charge capacitor C1. The said VCC voltage supply circuit 422 will soon be depleted of its power source. Since high-voltage linear regulator 426 can only steal power from the AC lines when Q1 is off, it is necessary for Q1 to be turned off for some portion in each AC line cycle. As will be described later, this power stealing requirement can be well supported by a short phase-notch pattern.

The power switch Q1 in this embodiment is an N-type MOSFET. In some other embodiments of the present invention, power switch Q1 may be replaced with a bipolar power transistor or an insulated gate bipolar transistor (IGBT).

The said power state controller 420 further includes a passive infra-red sensor 421, a phase-notch generator 425, a power state control logic circuit 424, a level-2 duration timer 428, and a photo sensor 427. Control logic circuit 424 is coupled to passive infra-red sensor 421, photo-sensor 427, duration timer 428, and phase-notch generator 425. The said passive infra-red sensor 421 detects the presence of a warm body, and triggers a power-step command sequence in response. Passive infra-red sensor 421 and photo sensor 427 serve as the actuators in this embodiment.

In this preferred embodiment, there are three power states but two power levels. A full (100%) power state corresponding to power level 2; a low (20%) power state corresponding to power level 1; and an OFF (0%) state. This preferred embodiment uses only one type of power-step command, which toggles LED driver 410 between level-2 and level-1 power. A [0°, 180°] phase-notch pattern is specified as the toggle command for phase-notch generator 425 and phase-notch decoder 413.

During the daytime, when there is sufficient ambient light, photo sensor 427 provides a logical high signal to set power state control logic circuit 424 to OFF state, which turns off Q1. During the night time, photo sensor 427 outputs a logical low signal. The falling edge of the output signal of photo sensor 427 triggers power state control logic circuit 424, which turns on Q1 and resets the value of a power state register 429 included in power state control logic circuit 424 to 1. LED lighting driver 410 powers up, wherein power level register 414 re-starts with a default value of 1. It directs power converter 412 to provide level-1 (20%) power to LED lamp 430.

Figure 5:
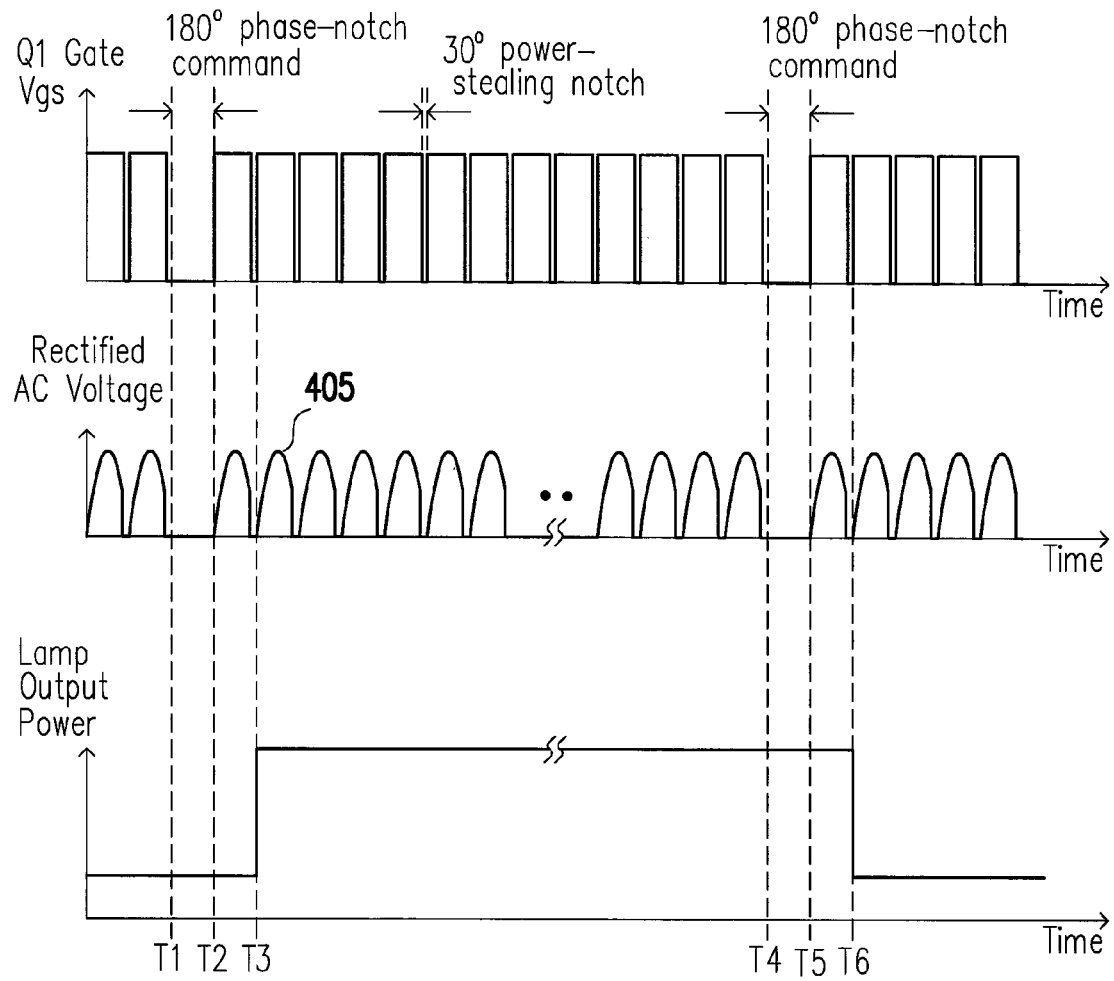
FIG. 5 is a waveform diagram showing some waveforms in the multi-level power control system of FIG. 4.
Figure 6:
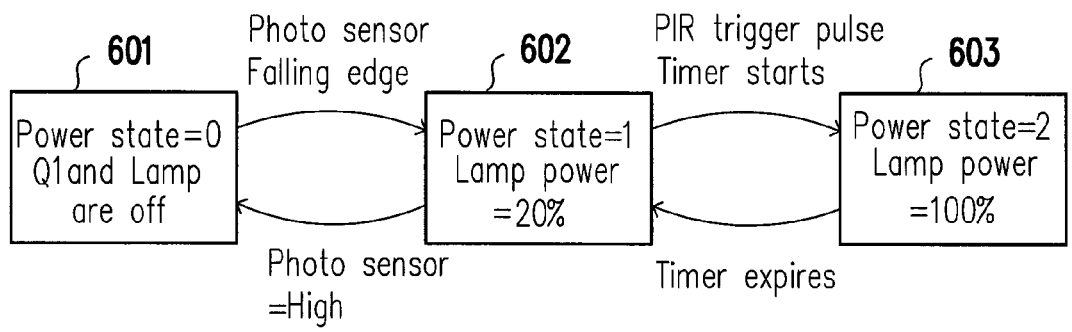
FIG. 6 is a state diagram showing the states of the multi-level power control system of FIG. 4.

Then, as shown in FIG. 5 and FIG. 6, at time T1, PIR sensor 421 detects the presence of a moving warm body, it issues a trigger pulse to power state control logic circuit 424. Control logic 424 directs phase-notch generator 425 to issue a [0°, 180°] phase-notch pattern from T1 to T2. Q1 is turned off from T1 to T2. Phase-notch detector 413 in LED lighting driver 410, upon detecting the phase-notch pattern, and after a short processing delay, will at T3 direct power level register 414 to toggle to the level-2 power state. As mentioned above, the value of power level register 414 controls the power level output by power converter 412. Therefore, power converter 412 then provides a full power to the said LED lamp 430.

Please notice that at T1, control logic circuit 424 also changes the value of its power state register 429 to 2. In addition, control logic circuit 424 also starts the level-2 duration timer 428 at T1. After duration timer 428 has counted up to a preset duration at T4, for example, 60 seconds after T3, duration timer 428 returns a time out signal back to control logic 424, which in turn, directs phase-notch generator 425 to issue another [0°, 180°] phase-notch pattern from T4 to T5. Phase-notch detector 413, upon detecting the second phase-notch pattern, and after a short processing delay, will at T6 direct power level register 414 to toggle back to level-1. Power converter 412 then provides a level-1 or 20% power to LED lamp 430. Please notice that, at T4, control logic circuit 424 also resets the value of its power state register 429 back to 1. As long as power state control logic circuit 424 is turned on, the values of power state register 429 and power level register 414 are always synchronized to be equal.

Please notice that as shown in FIG. 5, the rectified AC voltage on line 405 has two types of phase-notch patterns. The first phase-notch pattern [0°, 180°] as described above, is used as the power-step command to toggle the output power of DC-DC power converter 412 between level-1 and level-2. This one shot, phase-notch pattern for power-step command is generated once for thousands, even millions of AC line cycles.

The second phase-notch pattern, [150°, 180°], is generated in every AC half line cycle to enable the high-voltage linear regulator 426 to steal a small amount of power to sustain the operation of power state controller 420. Since the second phase-notch is only 30° wide, it will not be confused by phase-notch decoder 414 as the 180° wide pattern for a toggle command. Also, as for LED lighting driver 410 and its power converter 412 are concerned, the input voltage waveform with 30° short phase-notches will appear largely no difference from a normal un-notched waveform in terms of operational functionality.

FIG. 6 shows the state diagram for both power state controller 420 and multi-level LED power driver 410. During the daytime, the output of photo sensor 427 is high. This output keeps power state control logic circuit 424 staying in state 0. This is shown as state 601. Both Q1 and lamp 430 are off. After sunset, the ambient light falls into dark, the output of photo sensor 427 drops low. The falling edge of the output of photo sensor 427 directs power state control logic circuit 424 to enter state 1, which turns on Q1 to form the current-flow path, and LED driver 410 also enters state 1. This is shown as state 602. On the other hand, when photo sensor 427 detects the ambient light is high again in the morning, its output goes high, which directs power state control logic circuit 424 to return to state 0, and turn off Q1 to break the current-flow path indefinitely. Deprived of its input power, LED lighting driver 410 and LED lamp 430 will both fall into OFF state or state 601.

Now, if the PIR detector 427 detects a moving warm body during the night-time, it will trigger power level control 420 to output a phase-notch toggle signal via intermediate AC line 403 to LED lighting driver 410, which enters the level-2 power state. Power converter 412 then supplies 100% power to LED lamp 430. This is shown as state 603. After duration timer 428 expires, power state controller 420 will issue another phase-notch toggle signal to LED lighting driver 410, which returns to the level-1 power state, or state 602. Power converter 412 then supplies 20% power to the LED lamp.

Figure 7:
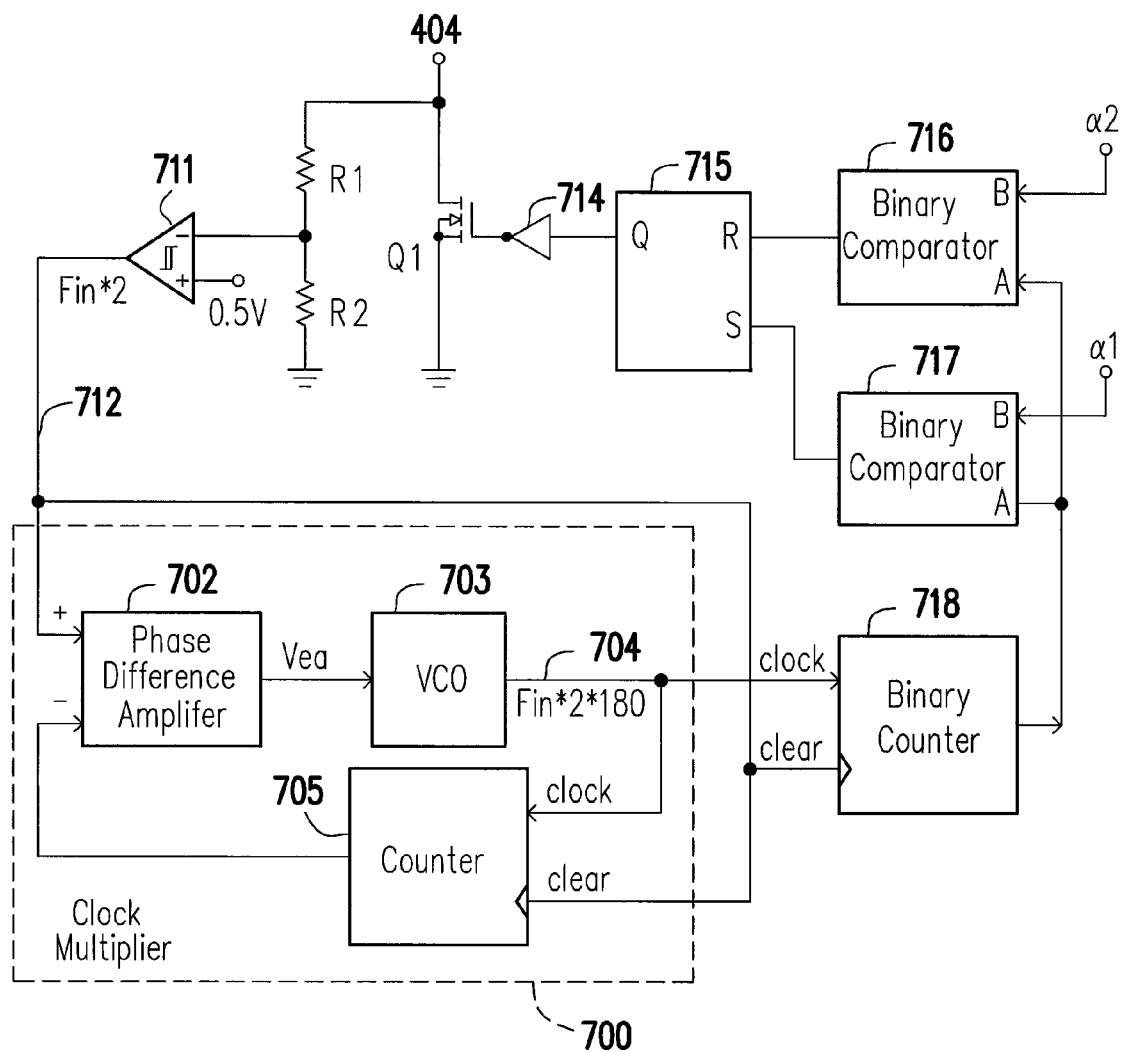
FIG. 7 is a schematic diagram showing a phase-notch generator according to an embodiment of the present invention.

Please notice that phase-notch generator 425 is designed to be adaptive to either 60 Hz or 50 Hz AC line frequency. A preferred embodiment of phase-notch generator 425 is shown in FIG. 7. The phase-notch generator includes a phase-locked loop (PLL) clock multiplier 700, a binary counter 718, two binary comparators 716 and 717, an SR-type flip-flop 715, and a logic inverter 714. Clock multiplier 700 is coupled to a zero-crossing detector comparator 711. Binary counter 718 is coupled to clock multiplier 700. Binary comparators 716 and 717 are coupled between flip-flop 715 and binary counter 718. Logic inverter 714 is coupled between power switch Q1 and flip-flop 715.

Zero-crossing detector comparator 711 is coupled to line 404 via voltage-divider pair, R1 and R2. The current-flow control circuit in FIG. 4 produces a rectified AC line voltage on line 404 by rectifying the AC line voltage. Zero-crossing detector comparator 711 is analogous to zero-crossing detector 423 in FIG. 4. Zero-crossing detector comparator 711 compares the rectified AC line voltage with a threshold voltage. Comparator 711 generates a zero-crossing pulse on its output line 712 when the voltage level on line 404 drops below the threshold voltage, such as 30V. Since each line cycle has two zero-crossing points, the zero-crossing pulse rate on line 712 is Fin*2, where Fin is the line frequency, 50 Hz in Europe countries, 60 Hz in USA. In this exemplar embodiment, we use [0°, 180°] phase notch pattern for the said power level toggle command.

The inverted output of SR flip-flop 715 is coupled to the gate terminal of power switch Q1. PLL clock multiplier 700 uses a phase-locked loop to generate a clock signal with a frequency of Fin*2*180 on its output line 704. The phase-lock loop includes a phase difference amplifier 702, a voltage-controlled oscillator (VCO) 703, and a divided-by-180 counter 705.

The non-inverting input of phase difference amplifier 702 is coupled to the output of comparator 711. The inverted input of phase difference amplifier 702 is coupled to the output of counter 705. Phase difference amplifier 702 generates an error voltage Vea for VCO 703. The output of VCO 703, line 704, is coupled to counter 705 as well as to binary counter 718. Since phase difference amplifier 702 has a gain factor of 60 dB or higher, PLL clock multiplier 700 can lock in an output frequency precisely 180 times of the double input frequency, Fin*2. Therefore, the clock rate on line 704 is equivalent to one clock per 1° of the line cycle.

Binary comparator 716 resets the SR flip-flop 715 when its A input exceeds its B input. Similarly, binary comparator 717 sets the SR flip-flop 715 when its A input exceeds its B input. Binary comparators 716 and 717 receive the counted value of binary counter 718 as their A inputs. Assume the B input, α1, to binary comparator 717 is 150 and the B input, α2, to binary comparator 716 is 180. Binary counter 718 counts the number of clock cycles of clock multiplier 700 output. At the end of each half line cycle, binary counter 718 has a value of 180, which triggers binary comparator 716 to reset SR flip-flop 715, whose output goes low. The low output of SR flip-flop 715 triggers logic inverter 714 to turn on power switch Q1. Then comparator 711 output goes high, which clears and restarts binary counter 718. PLL clock generator 700, locked into a clock rate of 180*2*Fin, provides a stable clock input to binary counter 718. When binary counter 718 counts up to α1 value of 150, the output of binary comparator 717 goes high, which sets SR flip-flop 715. The high output of SR flip-flop 715 triggers logic inverter 714 to turn off power switch Q1. When binary counter 718 counts up to α2 value of 180, binary comparator 716 resets SR flip-flop 715, turning on power switch Q1 again. Since power switch Q1 is turned off from α1 to α2, a phase-notch pattern is created between these two phase angles.

The discussion above shows that the phase-notch generator in FIG. 7 can generate different phase-notch patterns by loading different values of α1 and α2 into binary comparators 716 and 717. Referring to FIG. 4 again, power state control logic circuit 424 may output values of α1=150 and α2=180 in each half cycle of the AC line voltage to direct phase-notch generator 425 to generate a power-stealing phase-notch pattern. Power state control logic circuit 424 may output the values of α1=0 and α2=180 in response to the output of PIR sensor 421 to direct phase-notch generator 425 to generate a 180° toggle command phase-notch pattern.

Figure 8:
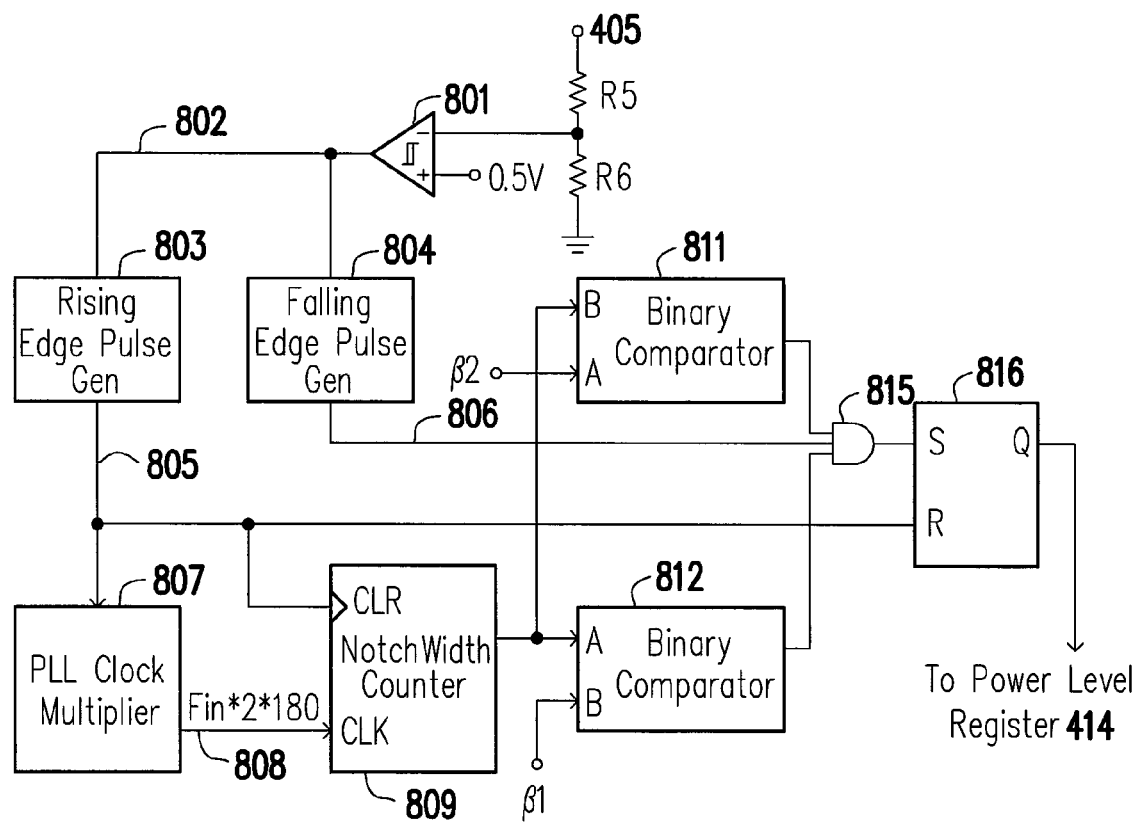
FIG. 8 is a schematic diagram showing a phase-notch decoder according to an embodiment of the present invention.

It is equally desirable to make phase-notch decoder 413 adaptive to either 60 Hz or 50 Hz AC line frequency. A preferred embodiment for phase-notch decoder 413 is shown in FIG. 8. The phase-notch decoder includes a zero-crossing comparator 801, a rising edge pulse generator 803, a falling edge pulse generator 804, a PLL clock multiplier 807, a notch width counter 809, two binary comparators 811 and 812, an AND gate 815, and an SR flip-flop 816. Zero-crossing comparator 801 is coupled to the output line 405 of bridge rectifier 411 through R5 and R6. Rising edge pulse generator 803 is coupled to zero-crossing comparator 801. Falling edge pulse generator 804 is also coupled to zero-crossing comparator 801. Clock multiplier 807 is coupled to rising edge pulse generator 803. Counter 809 is coupled to clock multiplier 807. Binary comparators 811 and 812 are both coupled to counter 809. AND gate 815 is coupled to falling edge pulse generator 804 and the outputs of binary comparators 811 and 812. SR flip-flop 816 is coupled between AND gate 815 and power level register 414.

Further, the voltage divider resistor pair R5 and R6 is coupled to the rectified AC line voltage on line 405. A scaled down voltage waveform of line 405 is coupled to the said zero-crossing comparator 801. Zero-crossing comparator 801 compares the rectified AC line voltage with a threshold voltage. The output of comparator 801 goes high when the said rectified AC voltage 405 drops below the threshold voltage, such as 30V. Notice 30V=0.5V*(1+R5/R6).

Figure 9:
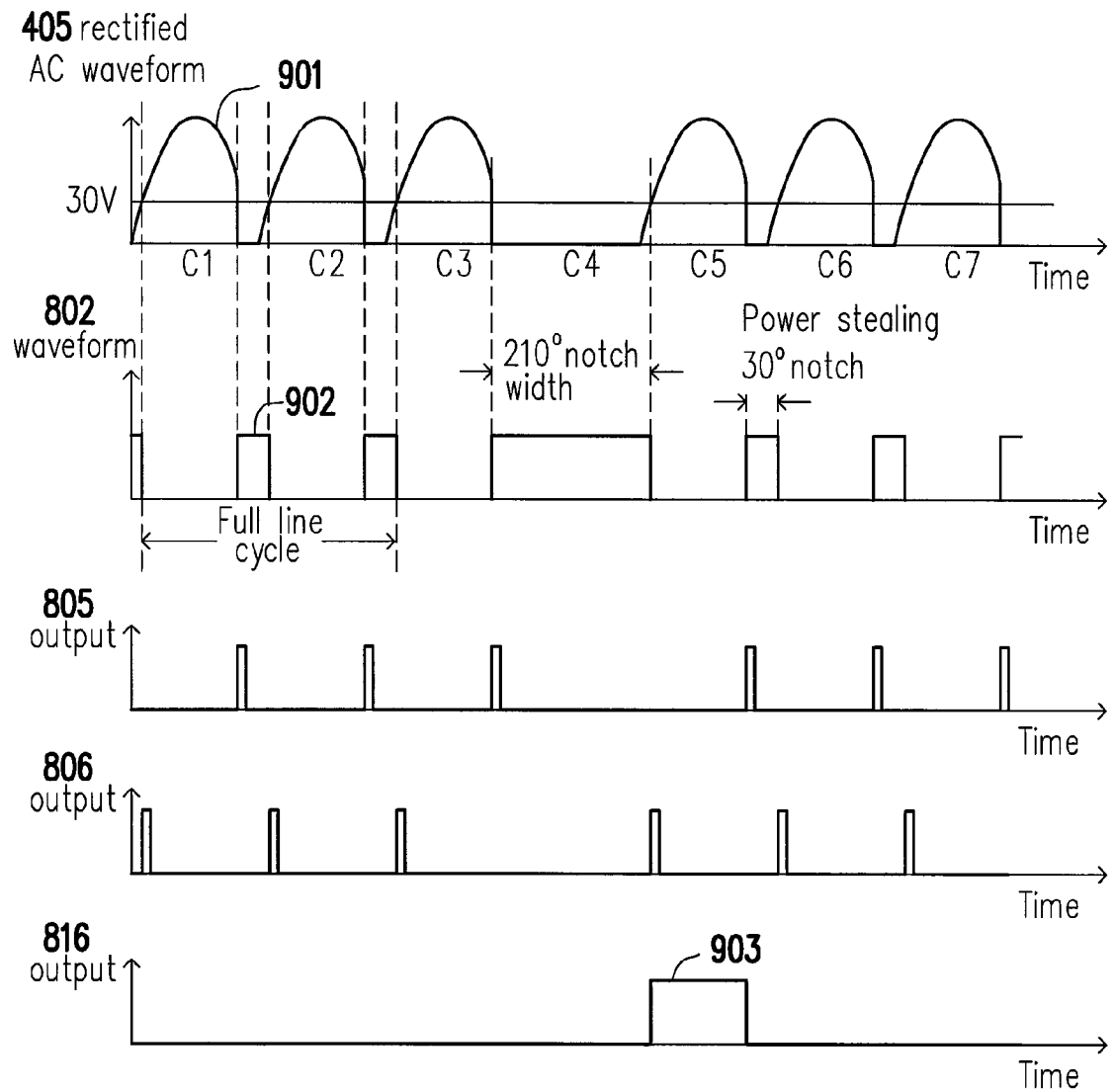
FIG. 9 is a waveform diagram showing some waveforms in the phase-notch decoder of FIG. 8.

As shown in FIG. 9, waveform 901 is the rectified AC waveform on line 405. There is a [150°, 180°] phase-notch pattern for power stealing purpose in every half line cycle. However, there is a power-step command in half line cycle C4. It is a [0°, 180°] phase-notch pattern. But with the [150°, 180°] of the previous short phase-notch pattern for power stealing purpose, the combined phase-notch width is 210°.

Rising edge pulse generator 803 outputs a pulse in response to every rising edge output by zero-crossing comparator 801. In steady state operation, rising edge pulse generator 803 provides a steady clock of frequency Fin*2 to PLL clock multiplier 807. PLL clock multiplier 807 generates an output clock signal 808 at a frequency of 180*2*Fin. Clock 808 is coupled to notch width counter 809. Notch width counter 809 counts the numbers of the clock pulses on line 808. Further, notch-width counter 809 is cleared and restarted by the pulses from rising edge pulse generator 803. Essentially, counter 809 always counts up to 359 before it is cleared by a new pulse from rising edge pulse generator 803.

Binary comparator 811 compares the counted value of notch width counter 809 with a pre-set upper limit, β2. Similarly, binary comparator 812 compares the counted value of the notch width counter 809 with a pre-set lower limit, β1. The output of binary comparator 811 goes low when the counted value of the notch width counter 809 exceeds the upper limit. The output of binary comparator 812 goes high when the counted value of the notch width counter 809 exceeds the lower limit. Consequently, binary comparators 811 and 812 always monitor the counted value of notch width counter 809. In this particular case, the phase-notch width of 30 is a power stealing pattern, which should be ignored by the phase-notch decoder. On the other hand, the phase-notch width of 210 is a power-step command pattern, which should be recognized by the phase-notch decoder. Notice that, to qualify a phase-notch width of 210, a proper value for the lower limit, β1, can be set around 190; whereas a proper value for the upper limit, β2, can be set around 230.

AND gate 815 receives the output of falling edge pulse generator 804, the output of binary comparator 811, and the output of binary comparator 812 as inputs. Falling edge pulse generator 804 outputs a pulse in response to every falling edge of zero-crossing comparator 801 output. In other words, a pulse output by rising edge pulse generator 803 marks the beginning of a phase-notch pattern; and a pulse output by falling edge pulse generator 804 marks the end of a phase-notch pattern. When a phase-notch pattern ends and its width is larger than the pre-set lower limit but smaller than the pre-set upper limit, all of the three input lines of AND gate 815 rise to logical high state, which sets the output of SR flip-flop 816. The set output of SR flip-flop 816 triggers a power-step command to direct power level register 414 in FIG. 4 to switch its power level.

Now please refer to FIG. 9. Waveform 901 in FIG. 9 is the waveform of the rectified AC voltage on line 405 Waveform 902 in FIG. 9 is the output waveform of comparator 801 on line 802. There is a short phase-notch pattern with a width of about 30 counts for each half line cycle. However, in half line cycle C4, there is a phase-notch pattern with a width of about 210 counts. The phase-notch decoder disqualifies all short phase-notch patterns, and only qualifies the power-step command phase-notch pattern in the half line cycle C4. Therefore, as shown in FIG. 9, at the end of cycle C4, a falling edge of waveform 902 triggers AND gate 815 to set SR flip-flop 816. The output of SR flip-flop 816 goes high, until it is cleared by the next rising edge on line 802. The high output signal of SR flip-flop 816 sends a valid power-step command to power level register 414 in FIG. 4 circuit. Waveform 903 in FIG. 9 shows that only one valid phase-notch command is generated after the end of half line cycle C4.

The Second Preferred Embodiment

Figure 10:
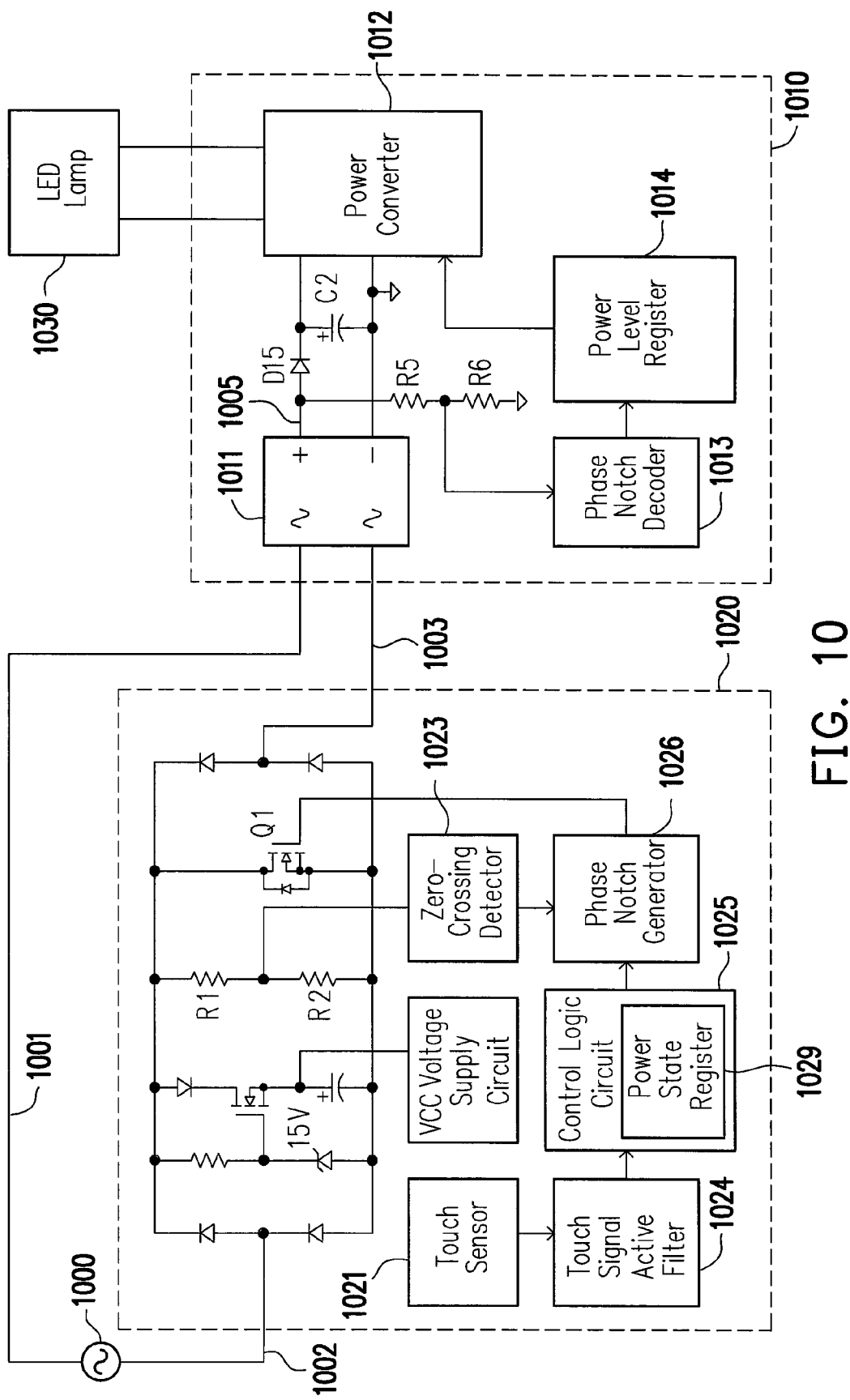
FIG. 10 is a schematic diagram showing a multi-level power control system according to another embodiment of the present invention.

FIG. 10 shows a three-level touch lighting control system according to the second preferred embodiment of the present invention. The three-level touch lighting control system includes a total of 4 power states—an OFF state, a level-1 state at 20% power, a level-2 state at 50% power, and a level-3 state at 100% power. The three-level touch lighting control system further includes a single actuator 1021, a single power-step command, and a single phase-notch pattern. The single actuator is a wall-mounted touch sensor, such as a touch pad. The single power-step command is a step-up command, with state 3 rounding back to state 1. The single phase-notch pattern is a [0°, 180°] pattern used in this exemplar embodiment.

LED lighting driver 1010 is essentially similar to LED lighting driver 410 in FIG. 4. Bridge rectifier 1011 is analogous to bridge rectifier 411 in FIG. 4. The main difference is that there are a total of 3 power levels in driver 1010; compared to the total of 2 power levels in driver 410.

Power state controller 1020 also includes a current-flow control circuit, a power-stealing circuit, a VCC voltage supply circuit, and a zero-crossing detector 1023. However, power state controller 1020 now further includes a touch sensor 1021, a touch signal active filter 1024, a power state control logic circuit 1025, and a phase-notch generator 1026. Power state control logic circuit 1025 includes a power state register 1029.

Touch sensor 1021 detects the physical touch of a human finger via a conductive, resistive, capacitive, or inductive means and outputs a touch signal in response to the physical touch. Touch signal active filter 1024 receives the touch signal from touch sensor 1021, and provides anti-bouncing signal filtering and conditioning to generate a clean and steady touch pulse. Upon receiving a valid touch pulse, power state control logic circuit 1025 increases the value of power state register 1029 by one.

Figure 11:
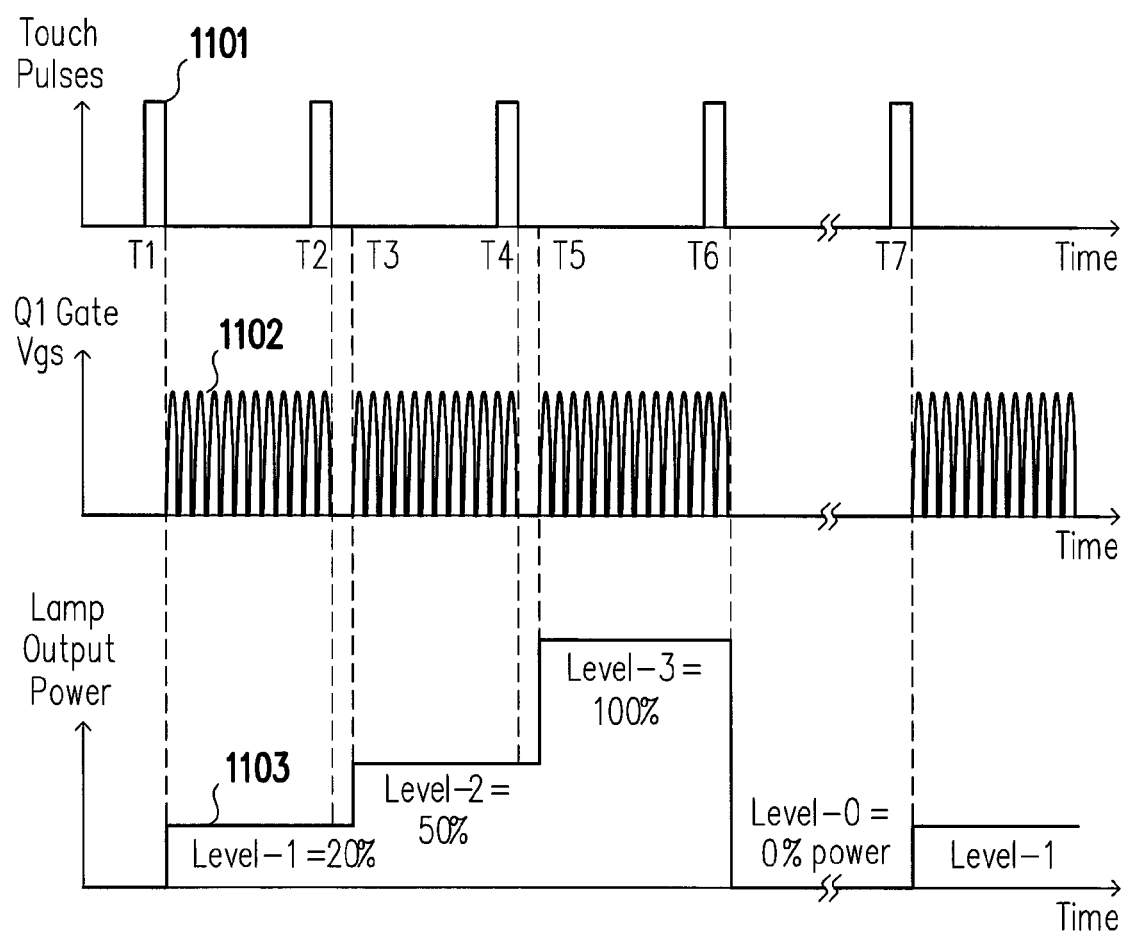
FIG. 11 is a waveform diagram showing some waveforms in the multi-level power control system of FIG. 10.

Please refer to FIG. 11. Waveform 1101 in FIG. 11 is the touch pulse output by touch signal active filter 1024. Waveform 1102 in FIG. 11 is the rectified AC voltage on the output of bridge rectifier 1011. Waveform 1103 in FIG. 11 is the output power level of LED lamp 1030. As shown in FIG. 11, starting with state-0, a first touch pulse at time T1 triggers control logic circuit 1025 into state-1. At time T1, control logic circuit 1025 turns on power switch Q1 via phase-notch generator 1026. After Q1 is turned on, AC line 1002 is now effectively connected to AC line 1003, establishing an AC current-flow path. LED lighting driver 1010 then enters its default power level of level-1. Power converter 1012 provides 20% power to LED lamp 1030.

Then, a second touch pulse at T2 triggers control logic circuit 1025 to enter state 2, which directs phase-notch generator 1026 to issue a phase-notch pattern until time T3. Upon receiving the T3 phase notch pattern, LED lighting driver 1010 enters level-2 power state, providing 50% power to LED lamp 1030.

Then, a third touch pulse at T4 triggers control logic circuit 1025 to enter state 3, which directs phase-notch generator 1026 to issue a phase-notch pattern until time T5. Upon receiving the T5 phase-notch pattern, LED lighting driver 1010 enters level-3 power state, providing 100% power to LED lamp 1030.

Then, a fourth touch pulse at T6 triggers power state control logic circuit 1025 to enter state 0, which directs phase-notch generator 1026 to turn off power switch Q1 indefinitely. After Q1 is turned off, LED lighting driver 1010 will soon drop out; therefore no power is provided to LED lamp 1030.

Then, a fifth touch pulse at T7 triggers control logic circuit 1025 and LED driver 1010 to restart to level-1 power state again.

Please notice that, overall, this touch control lighting system uses only one type of phase-notch pattern. Each touch sensor pulse triggers a phase-notch pattern and steps up the lamp power by one level. Except, from level-3 power state, a new touch pulse causes Q1 to turn off and LED driver 1010 to drop out indefinitely.

Please also notice that, in wall-mounted applications, power state controller 1020 still needs to steal a small amount of power from AC lines 1002 and 1003 for operating its internal circuit. Similar to the case of the FIG. 4 circuit, there is a need to use a short phase-notch of [150°, 180°] pattern to support the power stealing scheme. The longer phase-notch pattern for the step-up power command is a [0°, 180°] pattern.

The Third Preferred Embodiment

Figure 12:
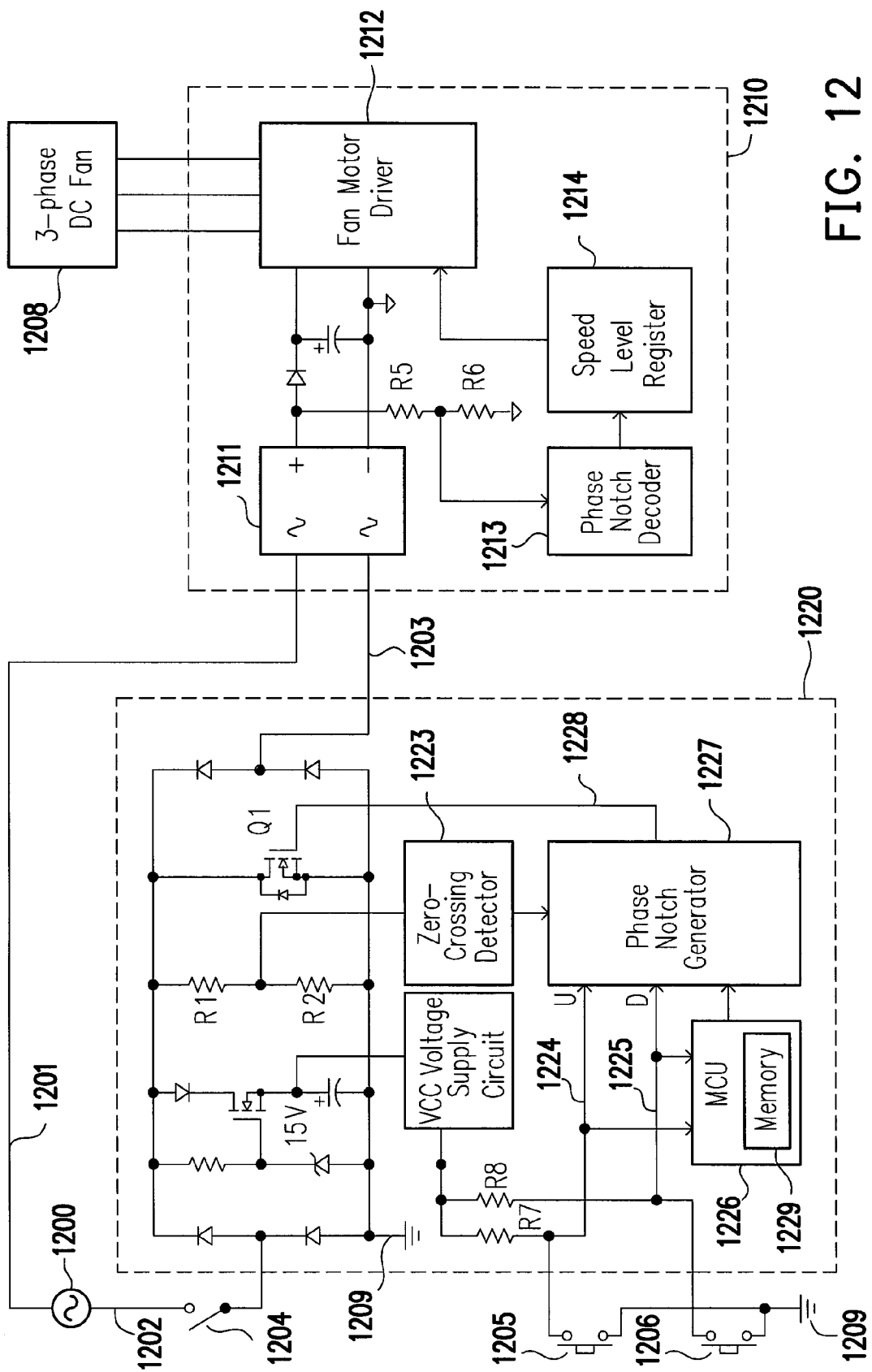
FIG. 12 is a schematic diagram showing a multi-level power control system according to another embodiment of the present invention.

FIG. 12 shows an 8-level ceiling-fan speed control system according to the third preferred embodiment of the present invention. The 8-level ceiling-fan speed control system includes a total of 8 power states, two actuators, one ON-OFF switch, two power-step command types, and a microcontroller unit (MCU). The 8 power states include an OFF state and 7 fan speed levels (power levels) of 120, 180, 240, 300, 360, 420, and 480 revolutions per minute (RPM), respectively. The two actuators include a normally-off push button for step-up commands and a normally-off push button for step-down commands. The ON-OFF switch is a single-pole-single-throw switch for power-up and power-down commands. The two power-step command types correspond to two phase-notch patterns. The first power-step command type is a step-up command with a phase-notch pattern of [0°, 180°] or a phase-notch width of 180°. The second power-step command type is a step-down command with a phase-notch pattern of [120°, 180°] or a phase-notch width of 60°. MCU 1226 includes a flash memory 1229 for storing the last fan speed setting.

The 8-level ceiling-fan speed control system in this embodiment includes a fan speed regulator 1210 and a ceiling-fan power state controller 1220. The fan speed regulator 1210 is essentially similar to the LED lighting driver 1010 in FIG. 10. The major differences are (A) There are a total of 7 power levels in the fan speed regulator 1210. (B) A fan motor driver 1212 is used to drive a 3-phase brushless DC fan 1208.

The ceiling-fan power state controller 1220 is also essentially similar to the power state controller 1020 in FIG. 10. The main differences are: (A) There are two push button actuators 1205 and 1206, and one power on-off switch 1204. (B) The two actuators 1205 and 1206 support a step-up command and a step-down command, respectively. (C) There is a micro controller unit (MCU) 1226 and its associated flash memory 1229 for storing the last fan speed setting.

Figure 13:
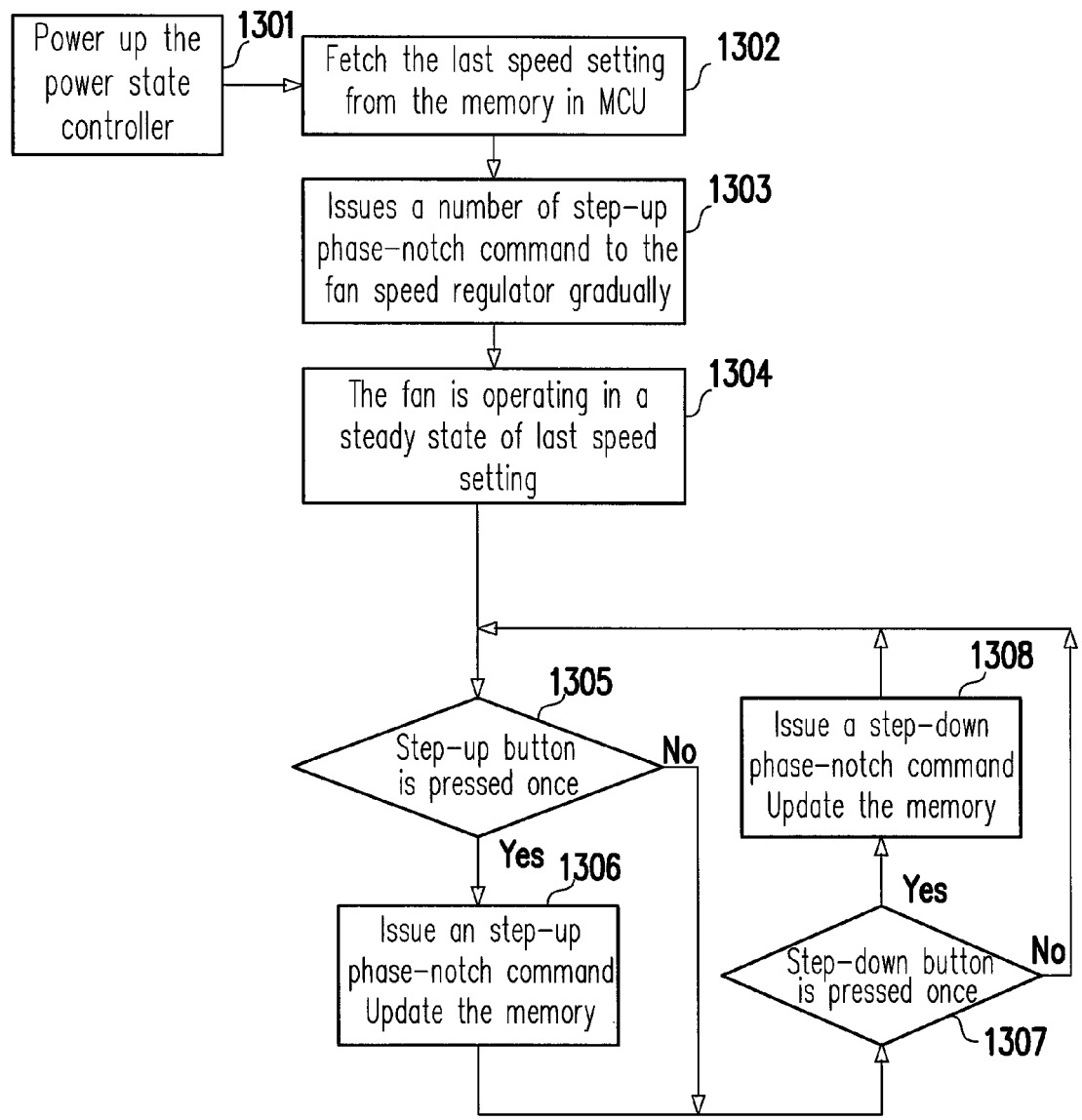
FIG. 13 is a flow chart showing a multi-level power control method executed by the multi-level power control system of FIG. 12.

Please notice that, as shown in the circuit diagram in FIG. 12 and the flow chart in FIG. 13, if power switch 1204 is turned to an OFF position, there is no power supplied either to power state controller 1220 or to fan speed regulator 1210. The system is at an OFF state.

Then if power switch 1204 is turned on, both power state controller 1220 and MCU 1226 will power up in step 1301. It will then turn on Q1, which connects AC line 1202 to AC line 1203, establishing an AC current-flow path. Fan speed regulator 1210 powers up into its default level-1 state. In response, fan motor driver 1212 regulates DC fan 1208 to the 120 RPM speed level.

Then in step 1302 MCU 1226 fetches the last fan-speed setting from its flash memory 1229. Assuming the last speed setting is at level-n, MCU 1226 will then issue a number, n−1, of step-up commands (i.e. a same number of phase-notch patterns) to fan-speed regulator 1210 via phase-notch generator 1227, over a span of several seconds, in step 1303. Therefore, in step 1304, the fan speed is increased to the last speed setting stored in flash memory 1229.

Now, after the ceiling fan powers up to its previous speed setting, it is ready for a user to change its speed. Please notice that, the top end of the push button 1205 is coupled to an up-trigger line 1224, as well as to the VCC supply voltage via a pull-up resistor R7. Similarly, the top end of the push button 1206 is coupled to a down-trigger line 1225, as well as to the VCC supply voltage via a pull-up resistor R8. The lower ends of push buttons 1205 and 1206 are both coupled to the controller circuit ground 1209.

Next, MCU 1226 checks whether step-up push button 1205 is pressed or not in step 1305. If step-up push button 1205 is pressed, it will connect up-trigger line 1224 to the voltage level (0 volt) of the circuit ground 1209. After the user release push button 1205, trigger line 1224 will be pulled up to VCC by resistor R7. This creates a rising edge on trigger line 1224, which directs phase-notch generator 1227 to issue a step-up phase-notch pattern of [0°, 180°] in step 1306. At the same time, the rising edge directs MCU 1226 to increase its speed-level setting value stored in flash memory 1229 by one. Also, upon receiving a [0°, 180°] phase-notch pattern, phase-notch decoder 1213 will direct speed-level register 1214 to increase its value by one. Fan motor driver 1212 then increases the fan speed by one level according to the value of speed-level register 1214.

Next, MCU 1226 checks whether step-down push button 1206 is pressed or not in step 1307. Similarly, if the step-down push button 1206 is pressed once, a step-down phase-notch pattern of [120°, 180°] will be issued to direct the fan speed regulator 1210 to reduce the fan speed by one level in step 1308. The power state integer value stored in the MCU memory 1229 and the speed-level register 1214 value are also reduced by one. Next, the flow returns to step 1305.

Please notice that it is important for phase-notch decoder 1213 to be able to differentiate a step-up command from a step-down command. In practice, this means the phase-notch decoder 1213 must include two sets of upper limit comparators, lower limit comparators, AND gates and SR flip-flops. Each set is analogous to upper limit comparator 811, lower limit comparator 812, AND gate 815 and SR flip-flop 816 in FIG. 8. The first set is used for detecting the step-up command, while the second set is used for detecting the step-down command.

Each multiple-level power control system in the previous exemplary embodiments of the present invention controls the power levels of an LED lamp or a DC fan. However, in other embodiments of the present invention, a multiple-level power control system can control the power levels of a more generic electric power device. The electric power device may be a lighting device, a group of lighting devices, a brushless DC motor, a group of DC motors, an electric fan, or a group of electric fans.

In summary, the present invention provides a multi-level power control system. Compared to RF and IR remote control solutions, this multi-level power control system is simple and has low cost. The multi-level power control system can offer one or more intermediate power levels or speed levels, even in a high ambient temperature or in a high electromagnetic noise environment.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A multiple-level power control system, comprising:
a power state controller, outputting a first phase-notch pattern;
an electric power device;
a multi-level power driver, coupled to the electric power device, driving the electric power device at one of a plurality of power levels, decoding the first phase-notch pattern as a power step command, and switching from one of the power levels to another one of the power levels according to the power step command;
a first alternating current (AC) line, coupled between a utility AC voltage and the multi-level power driver;
a second AC line, coupled between the utility AC voltage and the power state controller; and
an intermediate AC line, coupled between the power state controller and the multi-level power driver, wherein both of the power state controller and the multi-level power driver are powered by the utility AC voltage through the first AC line, the second AC line, and the intermediate AC line, and the power state controller outputs the first phase-notch pattern to the multi-level power driver via the intermediate AC line,
wherein the multi-level power driver further comprises:
a bridge rectifier, coupled to the first AC line, the intermediary AC line and a phase-notch decoder, receiving an AC voltage comprising the first phase-notch pattern from the first AC line and the intermediary AC line, producing a rectified AC voltage by rectifying the AC voltage, and providing the rectified AC voltage to the phase-notch decoder;
the phase-notch decoder, recognizing the first phase-notch pattern as the power step command when a width of the first phase-notch pattern is smaller than an upper limit and larger than a lower limit, wherein the phase-notch decoder comprises:
a zero-crossing comparator, coupled to the bridge rectifier, comparing the rectified AC voltage with a first threshold voltage;
a rising edge pulse generator, coupled to the zero-crossing comparator, outputting a pulse in response to every rising edge output by the zero-crossing comparator;
a falling edge pulse generator, coupled to the zero-crossing comparator, outputting a pulse in response to every falling edge output by the zero-crossing comparator;
a first clock multiplier, coupled to the rising edge pulse generator, producing a first clock signal by multiplying a frequency of an output of the rising edge pulse generator by a first pre-determined value;
a first binary counter, coupled to the first clock multiplier, counting cycles of the first clock signal;
a first binary comparator, coupled to the first binary counter, comparing a counted value of the first binary counter with the upper limit;

a second binary comparator, coupled to the first binary counter, comparing the counted value of the first binary counter with the lower limit;

an AND gate, coupled to the falling edge pulse generator, the first binary comparator, and the second binary comparator, receiving an output of the falling edge pulse generator, an output of the first binary comparator, and an output of the second binary comparator as inputs; and a first flip-flop, coupled between the AND gate and a power level register, wherein an output of the first flip-flop is set by an output of the AND gate, and the set output of the first flip-flop is provided to the power level register as the power step command;

the power level register, coupled to the phase-notch decoder, storing a power level value, and adjusting the power level value according to the power step command;

a power converter, coupled to the power level register, driving the electric power device at one of the power levels corresponding to the power level value;

a blocking diode, comprising an anode end and a cathode end, the anode end coupled to the bridge rectifier; and a bulk capacitor, coupled to the cathode end of the blocking diode, wherein the rectified AC voltage charges the bulk capacitor to a bulk DC voltage via the blocking diode and the power converter drives the electric power device with the bulk DC voltage.

2. The multiple-level power control system of claim 1, wherein the first phase-notch pattern is a one-shot signal having a voltage level of zero volts and spanning a pre-determined width of phase angles of an AC line cycle.

3. The multiple-level power control system of claim 1, wherein the electric power device is a lighting device, a group of lighting devices, a brushless direct current (DC) motor, a group of DC motors, an electric fan, or a group of electric fans.

4. The multiple-level power control system of claim 1, wherein the power state controller comprises:
at least one actuator;
a phase-notch generator; and
a control circuit, coupled to the at least one actuator and the phase-notch generator, outputting a first phase angle and a second phase angle in response to an output of the at lease one actuator to trigger the phase-notch generator to generate the first phase-notch pattern.

5. The multiple-level power control system of claim 4, wherein each of the at least one actuator is a toggle switch, a push button, a touch pad, a touch sensor, a photo-sensor, a sound sensor, a temperature sensor, a pressure sensor, a humidity sensor, an image sensor, a video image camera, a radio frequency (RF) sensor, or a passive infra-red sensor.

6. The multiple-level power control system of claim 4, wherein the power state controller further comprises:
a current-flow control circuit which comprises a power switch, coupled to the second AC line, the intermediate AC line, and the phase-notch generator, connecting the second AC line and the intermediate AC line to form a current-flow path to the multi-level power driver when the phase-notch generator turns on the power switch, disconnecting the second AC line from the intermediate AC line to break the current-flow path when the phase-notch generator turns off the power switch, wherein the phase-notch generator generates the first phase-notch pattern by turning off the power switch at the first phase angle of a line cycle of the utility AC voltage and turning on the power switch at the second phase angle of the line cycle of the utility AC voltage.

7. The multiple-level power control system of claim 6, wherein the power switch is an N-type power metal-oxide-semiconductor field-effect transistor (MOSFET), a bipolar power transistor, or an insulated gate bipolar transistor (IGBT), wherein a control end of the power switch is coupled to the phase-notch generator.

8. The multiple-level power control system of claim 6, wherein the current-flow control circuit further comprises an AC input end, an AC output end, a first diode, a second diode, a third diode, and a fourth diode, wherein the AC input end is coupled to the second AC line, the AC output end is coupled to the intermediate AC line, cathode ends of the first diode and the third diode are coupled to a first end of the power switch, anode ends of the second diode and the fourth diode are coupled to a second end of the power switch, the anode end of the first diode and the cathode end of the second diode are coupled to the AC input end, the anode end of the third diode and the cathode end of the fourth diode are coupled to the AC output end.

9. The multiple-level power control system of claim 8, wherein the power state controller further comprises:
a high-voltage linear regulator, coupled between the first end and the second end of the power switch, producing a bulk voltage by stealing power from the second AC line and the intermediate AC line when the power switch is turned off; and
a voltage supply circuit, coupled to the high-voltage linear regulator, receiving the bulk voltage to produce an operating voltage of the power state controller.

10. The multiple-level power control system of claim 9, wherein the phase-notch generator further generates a second phase-notch pattern in every half line cycle of the utility AC voltage to enable the high-voltage linear regulator to steal a small amount of power to sustain operation of the power state controller, the second phase-notch pattern is shorter than the first phase-notch pattern and the multi-level power driver ignores the second phase-notch pattern.

11. The multiple-level power control system of claim 6, wherein the current-flow control circuit produces a rectified utility AC voltage by rectifying the utility AC voltage, and the power state controller further comprises:
a zero-crossing detector, coupled to the current-flow control circuit, comparing the rectified utility AC voltage with a second threshold voltage;
wherein the phase-notch generator further comprises:
a second clock multiplier, coupled to the zero-crossing detector, producing a second clock signal by multiplying a frequency of an output of the zero-crossing detector by a second pre-determined value;
a second binary counter, coupled to the second clock multiplier, counting cycles of the second clock signal;
a second flip-flop;
a third binary comparator, coupled between the second flip-flop and the second binary counter, setting an output of the second flip-flop when an output of the second binary counter exceeds the first phase angle;
a fourth binary comparator, coupled between the second flip-flop and the second binary counter, resetting the output of the second flip-flop when the output of the second binary counter exceeds the second phase angle; and
a logic inverter, coupled between the power switch and the second flip-flop, turning on or turning off the power switch according to the output of the second flip-flop.

12. The multiple-level power control system of claim 6, wherein the power state controller further comprises a photo-sensor coupled to the control circuit; in response to a first output of the photo-sensor, the control circuit directs the phase-notch generator to turn on the power switch to form the current-flow path, and both of the power state controller and the multi-level power driver enter a default one of the power levels; in response to a second output of the photo-sensor, the control circuit directs the phase-notch generator to turn off the power switch to break the current-flow path, and both of the power state controller and the multi-level power driver enter an off state.

13. The multiple-level power control system of claim 4, wherein the power levels include a high power level and a low power level; wherein the power state controller further comprises a duration timer coupled to the control circuit; when the control circuit triggers the phase-notch generator to generate the first phase-notch pattern, the control circuit starts the duration timer, the multi-level power driver switches to the high power level in response to the first phase-notch pattern; when the duration timer expires, the control circuit triggers the phase-notch generator to generate the first phase-notch pattern again, and then the multi-level power driver switches back to the low power level in response to the first phase-notch pattern.

14. The multiple-level power control system of claim 4, wherein the power state controller comprises a first actuator and a second actuator, the first and the second actuators are coupled to the control circuit; the control circuit triggers the phase-notch generator to generate the first phase-notch pattern in response to an output of the first actuator, and then the multi-level power driver increases the current power level by one level of the plurality of the power levels in response to the first phase-notch pattern; the control circuit triggers the phase-notch generator to generate a third phase-notch pattern in response to an output of the second actuator, and then the multi-level power driver decreases the current power level by one level of the plurality of the power levels in response to the third phase-notch pattern.

15. The multiple-level power control system of claim 14, wherein when the current power level is the highest one of the power levels, the multi-level power driver switches to the lowest one of the power levels in response to the next first phase-notch pattern; when the current power level is the lowest one of the power levels, the multi-level power driver switches to the highest one of the power levels in response to the next third phase-notch pattern.

16. The multiple-level power control system of claim 1, wherein the power converter is a flyback converter, a forward converter, or a half-bridge converter, wherein the power converter provides a galvanic isolation between the multi-level power driver and the electric power device.

17. The multiple-level power control system of claim 1, wherein the power converter is a DC-DC converter or a linear regulator, wherein the power converter provides no galvanic isolation between the multi-level power driver and the electric power device.

* * * * *